United States Patent
Allidieres et al.

(10) Patent No.: US 11,953,157 B2
(45) Date of Patent: *Apr. 9, 2024

(54) METHOD AND FACILITY FOR STORING AND DISTRIBUTING LIQUEFIED HYDROGEN

(71) Applicant: L'Air Liquide, Societe Anonyme pour l'Etude et l'Exploitation des Procedes Georges Claude, Paris (FR)

(72) Inventors: Laurent Allidieres, Paris (FR); Renan Luis De Souza Silva, Paris (FR)

(73) Assignee: L'Air Liquide, Societe Anonyme Pour L'Etude Et L'Exploitation Des Procedes Claude Georges Claude, Paris (FR)

( * ) Notice: Subject to any disclaimer, the term of this patent is extended or adjusted under 35 U.S.C. 154(b) by 436 days.

This patent is subject to a terminal disclaimer.

(21) Appl. No.: 17/280,094

(22) PCT Filed: Sep. 24, 2019

(86) PCT No.: PCT/FR2019/052232
§ 371 (c)(1),
(2) Date: Mar. 25, 2021

(87) PCT Pub. No.: WO2020/074801
PCT Pub. Date: Apr. 16, 2020

(65) Prior Publication Data
US 2021/0341101 A1    Nov. 4, 2021

(30) Foreign Application Priority Data
Oct. 9, 2018   (FR) ........................................ 1859328

(51) Int. Cl.
*F17C 5/00* (2006.01)
*F17C 5/02* (2006.01)

(52) U.S. Cl.
CPC ................ *F17C 5/007* (2013.01); *F17C 5/02* (2013.01); *F17C 2203/0391* (2013.01);
(Continued)

(58) Field of Classification Search
CPC .... F17C 5/007; F17C 5/02; F17C 2203/0391; F17C 2205/0326; F17C 2221/012;
(Continued)

(56) References Cited

U.S. PATENT DOCUMENTS 7,559,213 B2 *  7/2009  Allam .................... F25J 1/0224
                                                        62/607
8,065,883 B2    11/2011  Pozivil
(Continued)

FOREIGN PATENT DOCUMENTS

DE    10 2010 047300    4/2012
FR    3 017 183         8/2015
(Continued)

OTHER PUBLICATIONS

International Search Report and Written Report for PCT/FR2019/052232, dated Jan. 2, 2020.
(Continued)

*Primary Examiner* — Justin M Jonaitis
(74) *Attorney, Agent, or Firm* — Justin K. Murray

(57) ABSTRACT

The invention relates to a method for storing and distributing liquefied hydrogen using a facility that comprises a store of liquid hydrogen at a predetermined storage pressure, a source of hydrogen gas, a liquefier comprising an inlet connected to the source and an outlet connected to the liquid hydrogen store, the store comprising a pipe for drawing liquid, comprising one end connected to the liquid hydrogen store and one end intended for being connected to at least one mobile tank, the method comprising a step of liquefying hydrogen gas supplied by the source and a step of transfer-
(Continued)

ring the liquefied hydrogen into the store, characterized in that the hydrogen liquefied by the liquefier and transferred into the store has a temperature lower than the bubble temperature of hydrogen at the storage pressure.

17 Claims, 2 Drawing Sheets

(52) U.S. Cl.
CPC ............... *F17C 2205/0326* (2013.01); *F17C 2221/012* (2013.01); *F17C 2223/0161* (2013.01); *F17C 2223/033* (2013.01); *F17C 2223/035* (2013.01); *F17C 2227/03* (2013.01); *F17C 2227/043* (2013.01); *F17C 2250/043* (2013.01); *F17C 2250/0439* (2013.01); *F17C 2265/031* (2013.01); *F17C 2265/034* (2013.01); *F17C 2265/035* (2013.01); *F17C 2265/036* (2013.01); *F17C 2265/037* (2013.01); *F17C 2265/061* (2013.01); *F17C 2265/063* (2013.01); *F17C 2270/0171* (2013.01)

(58) Field of Classification Search
CPC ........ F17C 2223/0161; F17C 2223/033; F17C 2223/035; F17C 2227/03; F17C 2227/043; F17C 2250/043; F17C 2250/0439; F17C 2265/031; F17C 2265/034; F17C 2265/035; F17C 2265/036; F17C 2265/037; F17C 2265/061; F17C 2265/063; F17C 2270/0171
USPC .......................................................... 62/50.2
See application file for complete search history.

(56) References Cited

U.S. PATENT DOCUMENTS

| | | | | |
|---|---|---|---|---|
| 11,506,342 | B1* | 11/2022 | Elgowainy | ................ F17C 9/04 |
| 2005/0284154 | A1* | 12/2005 | Peter | ......................... F17C 3/08 |
| | | | | 62/53.2 |
| 2009/0308083 | A1 | 12/2009 | Brunner | |
| 2016/0208984 | A1* | 7/2016 | Pages | ..................... F25J 1/0245 |
| 2017/0051875 | A1* | 2/2017 | Nagura | ..................... F17C 5/06 |
| 2017/0268463 | A1* | 9/2017 | Svoboda | ............ F02M 21/0209 |
| 2020/0056837 | A1 | 2/2020 | Hirose et al. | |

FOREIGN PATENT DOCUMENTS

| | | |
|---|---|---|
| FR | 3 017 184 | 8/2015 |
| GB | 2 515 091 | 12/2014 |
| JP | H05 215298 | 8/1993 |
| JP | H06 337191 | 12/1994 |
| JP | 2002 213697 | 7/2002 |
| JP | 2005 106120 | 4/2005 |
| JP | 2007 504414 | 3/2007 |
| JP | 2009 127632 | 6/2009 |
| JP | 2011 047477 | 3/2011 |
| JP | 2013 210044 | 10/2013 |
| JP | 2016 180479 | 10/2016 |
| JP | 2017 003065 | 1/2017 |
| JP | 2018 132182 | 8/2018 |
| JP | 2021 518569 | 8/2021 |
| WO | WO-2018173136 A1 * | 9/2018 |

OTHER PUBLICATIONS

French Search Report and Written Opinion for FR 1 859 328, dated May 29, 2019.

* cited by examiner

METHOD AND FACILITY FOR STORING AND DISTRIBUTING LIQUEFIED HYDROGEN

CROSS REFERENCE TO RELATED APPLICATIONS

This application is a § 371 of International PCT Application PCT/FR2019/052232, filed Sep. 24, 2019, which claims the benefit of FR1859328, filed Oct. 9, 2018, both of which are herein incorporated by reference in their entireties.

FIELD OF THE INVENTION

The invention relates to a method and installation for storing and distributing liquefied hydrogen.

The invention relates more particularly to a method for filling a liquid hydrogen tank, in particular a mobile tank of a semitrailer, the method comprising a first stage of transfer of a first amount of liquid hydrogen into the tank from a first source of liquid hydrogen comprising a hydrogen liquefier, the first amount of liquid hydrogen being provided in order to lower the temperature and the pressure in the tank.

BACKGROUND OF THE INVENTION

Due to its density in particular, liquid hydrogen is favored in comparison with gaseous hydrogen when large amounts of product have to be transported over long distances.

Another advantage of liquid hydrogen is related to its density and the large storage capacity in a hydrogen service station for fuel cell vehicles. A temperature of 20 K removes de facto all the impurities (which are solid at this temperature) from the gas, which optimizes the operation of the fuel cells.

On the other hand, due to the low density of liquid hydrogen (70 g/liter) in comparison with water, the pressure available by hydrostatic head is low, which makes pumping difficult, and the low temperature can generate fairly large evaporation losses during liquid transfers.

This is because the systems for loading trucks and tanks in factories for the liquefaction of hydrogen can result in losses which can range up to 15% of production (for example 0.2% loss from the tank, 5% loss by flash vaporization in the valve for filling the tank and 10% loss in the truck).

These losses by evaporation can, of course, be recovered, reheated, compressed after storage and reinjected into the liquefier. This is shown diagrammatically in FIG. 1, which represents an installation comprising a storage facility 4 for the storage of liquid produced. The hydrogen is produced from a source 2 of gaseous hydrogen which is liquefied in a liquefier 3 before its transfer to the storage facility 4. The boil-off gas can be withdrawn from a unit comprising, for example, in series, a heater 5, a buffer tank 6 (for example isobaric) and a compression component 7. The gas recovered and compressed can be admitted at the inlet of the liquefier 3 so that it can be reliquefied and reintroduced into the storage facility 4.

For example, the liquid hydrogen produced by the liquefier 3 feeds the storage facility 4 (for example proportioned for a self-sufficiency of several days of consumption in order to compensate for a breakdown of the liquefier) at a pressure of, for example, between 1.05 and 5 bar abs.

Conventionally, the liquid hydrogen produced is at its bubble point at the pressure of the storage facility due to the conventional design of hydrogen liquefaction units, with a hydrogen Claude cycle, where the liquefaction is carried out through a Joule-Thomson effect valve.

The tank 8 arrives at the loading station with a small volume percentage of liquid hydrogen (for example approximately 5%), pressurized (for example between 3 and 10 bar abs) and stratified with a hot gas headspace (with temperatures which can reach up to 100 K). All the internal walls of the tank 8 can also be "hot" (normally at the same temperature as the liquid with which it is in contact).

The tank or tanks 8 can be filled by gravity but this does not make possible rapid filling due to the low density of the liquid. The filling can also be carried out by pressure difference (pressure of the storage facility 4 higher than the pressure of the tank 8, in particular a pressure difference of between 300 mbar and 1 bar, depending on the desired rate of filling, which causes a flow when brought into fluidic communication). These losses of head have the effect of vaporizing a part of the liquid (unusual losses of head in valves or accidents, or losses of head in the line).

In addition, the contact of the hydrogen from the relatively colder storage facility 4 with the relatively warmer metal walls of the tank 8 and with the walls of the transfer piping also causes significant evaporation.

The hydrogen evaporated during this operation is then either vented or recirculated to the liquefier 3, as illustrated in FIG. 1. This solution thus requires proportioning the liquefier for a flow rate greater than that which can actually be used. In addition, this requires investing in a system for the recirculation of the flash gases, comprising a heater, an isobaric storage capacity (of the gasometer type) and a flash gas compressor; the flash gas can also in some cases be directly returned cold to the liquefier. This however disrupts the operations of the liquefier due to the instability of flow rate of boil-off originating from the operations for filling the trucks.

These solutions thus generate losses of product (discharge to the air) or require proportioning the liquefier 3 and the gas recovery unit in order to be able to absorb the boil-off gases produced during the filling of trucks.

One aim of the present invention is to overcome all or some of the disadvantages of the prior art noted above.

SUMMARY OF THE INVENTION

To this end, the method according to certain embodiments of the invention, moreover in accordance with the generic definition given for it in the preamble above, is essentially characterized in that the method comprises a second stage of transfer of a second amount of liquid hydrogen into the tank from a second source of liquid hydrogen comprising a liquid hydrogen storage facility, in which the second amount of liquid hydrogen is transferred into the tank by pressure difference between the liquid hydrogen storage facility and the tank.

Furthermore, embodiments of the invention can comprise one or more of the following characteristics:
  the first amount of liquid hydrogen supplied by the first source of liquid hydrogen has a temperature below the bubble point of hydrogen at the storage pressure in the tank,
  the first amount of liquid hydrogen transferred into the tank is one from: a predefined amount of liquid hydrogen, a predefined fraction of the volume of liquid storage in the tank, the amount of liquid hydrogen corresponding to a predefined duration of transfer of liquid hydrogen from the first source of liquid hydrogen to the tank with a specific flow rate, the amount of liquid hydrogen necessary to lower the temperature and the pressure in the tank by respective predetermined values, the amount of liquid hydrogen necessary to achieve, in the tank, respective predetermined temperature and pressure values, the method comprises, between the first transfer stage and the second transfer stage, a stage of reduction in the pressure within the tank comprising at least one from: a withdrawal of pressurized gas from the tank to the storage facility, in particular by pressure balancing, a withdrawal of pressurized gas to the outside, in particular a discharge to the atmosphere, the stage of reduction in the pressure within the tank comprises a withdrawal of pressurized gas from the tank to the liquid phase of the storage facility, in order to condense, at least in part, said pressurized gas in the storage facility, the method comprises a stage of transfer of liquid hydrogen from the first source of liquid hydrogen to the liquid hydrogen storage facility at a temperature adjusted in order to maintain the temperature in the storage facility within a specific interval, in particular a constant temperature, the method comprises a stage of reduction in the pressure within the tank via a withdrawal of pressurized gas from the tank to the outside, in particular into the atmosphere, on conclusion of this stage of reduction in the pressure, the pressure within the tank remaining greater than atmospheric pressure, the method comprising, prior to the first transfer stage, a stage of measurement or of estimation of the initial pressure and optionally temperature conditions within the tank, depending on the initial pressure and optionally temperature conditions within the tank before the first transfer stage, the method comprising or not comprising a stage of reduction in the pressure within the tank, when the initial pressure within the tank is between 1.05 and 12 bar absolute, in particular 3 bar absolute, the second transfer stage is carried out directly after the first transfer stage, that is to say without withdrawal of fluid from the tank between these two transfer stages with a view to a reduction in the pressure in the tank, when the initial pressure within the tank is between 4 and 8 bar abs, in particular equal to 6 bar abs, and when the initial temperature in the tank is between 80 and 120 K, in particular equal to 100 K, the method comprises a stage of reduction in the pressure within the tank between the two transfer stages, when the initial pressure within the tank is between 8 and 12 bar abs, in particular equal to 10 bar absolute, and when the initial temperature in the tank is between 20 and 120 K, in particular equal to 70 K or 100 K, the method comprises a stage of reduction in the pressure within the tank between the two transfer stages, the first amount of liquid hydrogen supplied by the first source of liquid hydrogen has a temperature between the saturation temperature at the pressure of the liquid and the temperature just above the solidification temperature of the hydrogen, in particular a temperature of 15 K to 23.7 K for a storage pressure of 2.5 bar, the first amount of liquid hydrogen supplied by the first source of liquid hydrogen has a temperature lower by 0.1 to 12 K with respect to the bubble point of hydrogen at the storage pressure in the tank, the first amount of liquid hydrogen supplied by the first source of liquid hydrogen has a temperature of between 20.4 K and 33 K for a storage pressure of between 1.05 and 12 bar and/or a temperature of between 15 K and 27.1 K for a storage pressure of between 1.05 and 5 bar.

The invention also relates to an installation for the storage and distribution of liquefied hydrogen comprising a liquid hydrogen storage facility at a specific storage pressure, at least one mobile tank to be filled, a source of gaseous hydrogen, a liquefier comprising an inlet connected to the source and an outlet connected to the liquid hydrogen storage facility, the storage facility comprising a liquid withdrawal pipe comprising an end connected to the liquid hydrogen storage facility and at least one other end intended to be connected to the mobile tank(s), the liquefier being configured to produce and to feed the storage facility with hydrogen at a temperature below the bubble point of hydrogen at the storage pressure, the installation comprising a boil-off gas recovery pipe comprising an end intended to be connected to the tank(s) and an end intended to be connected to the storage facility, in order to transfer this boil-off gas into the storage facility for the purpose of its liquefaction, the installation additionally comprising a transfer pipe having an end connected to the outlet of the liquefier and an end intended to be connected directly to the tank(s), the installation being configured to fill the at least one tank by transferring a first amount of liquid hydrogen from the liquefier into the tank via the transfer pipe and then a second amount of liquid hydrogen from the storage facility to the tank via the liquid withdrawal pipe, the installation being configured to optionally produce, between the transfers of the first and second amounts, a decrease in the pressure within the tank comprising at least one from: a withdrawal of pressurized gas from the tank to the storage facility via the recovery pipe, in particular by pressure balancing; a withdrawal of pressurized gas to the outside, in particular to the atmosphere, via a venting pipe.

According to other possible distinctive features:
the installation comprises a set of sensor(s) for measurement or estimation of the initial pressure and optionally temperature conditions within the tank before filling and the installation is configured to optionally produce, between the transfers of the first and second amounts, a decrease in the pressure within the tank as a function of said initial pressure and optionally temperature conditions within the tank.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims or the way in which said claims refer back to one another.

Other distinctive features and advantages will become apparent on reading the description below, which is made with reference to the figures, in which.

DETAILED DESCRIPTION OF THE INVENTION

Figure 1:
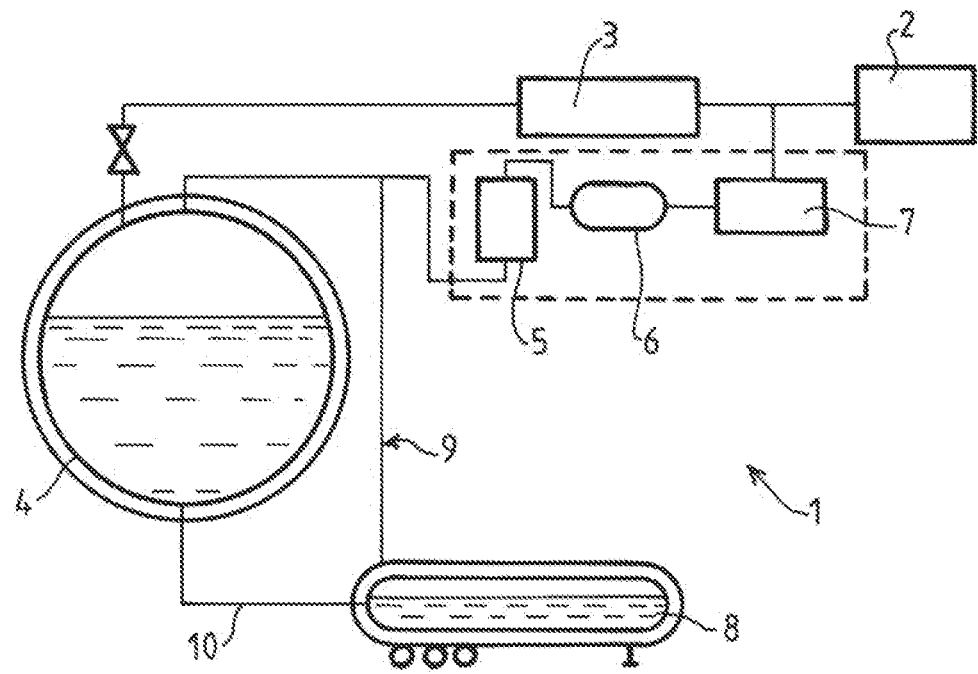
FIG. 1 represents a diagrammatic and partial view illustrating the structure and the operation of an installation according to the prior art.
Figure 2:
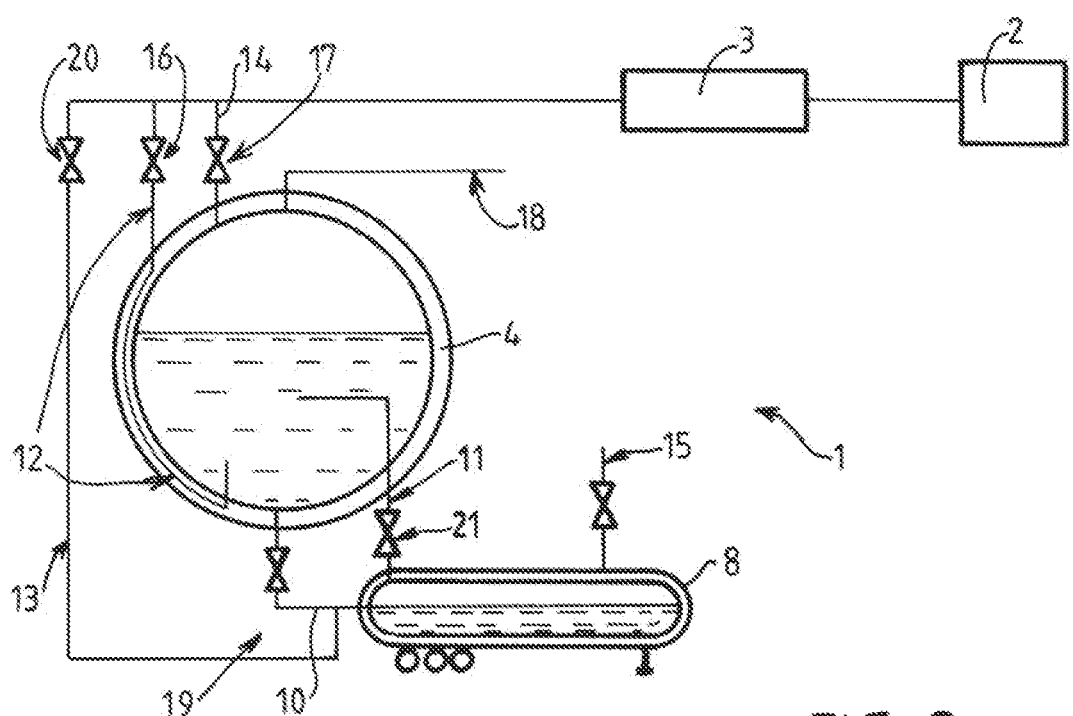
FIGS. 2 and 3 represent diagrammatic and partial views illustrating the structure and the operation of an example of installation according to the invention.

An installation 1 for storage and distribution of liquefied hydrogen according to an implementational example of the invention is represented in FIG. 2. The same elements as those of FIG. 1 are designated by the same numerical references.

The installation 1 comprises a liquid hydrogen storage facility 4 at a specific storage pressure. This storage facility 4 is, for example, a vacuum-insulated storage facility of high capacity, for example of several hundred cubic meters. This storage facility 4 conventionally contains a liquid phase with a vapor phase, it being possible for these two phases, as a result of the size of the tank and of the filling/emptying operations, not to be in thermodynamic equilibrium.

Conventionally, the storage pressure is preferably regulated, for example at a fixed value (for example between 1.05 and 11 bar, for example between 1.1 and 5 bar, in particular 2.5 bar absolute).

"Storage pressure" is understood to mean, for example, the mean pressure in the storage facility or in the bottom part of the storage facility or in the upper part (in the gas headspace). This is because, as a result of the low density of hydrogen, the pressure in the lower part of the storage facility is substantially equal to the pressure in the upper part.

The installation additionally comprises a source 2 of gaseous hydrogen and a liquefier 3 comprising an inlet connected to the source 2 and an outlet connected to the liquid hydrogen storage facility 4.

The source 2 can be a hydrogen network and/or a unit for the production of hydrogen (for example steam reforming and/or by electrolysis or any other appropriate source). The source can thus also comprise the recovery of hydrogen from an impure source (refinery residue gas, fatal hydrogen originating from a chlor-alkali electrolyzer, and the like).

The hydrogen supplied by the source 2 and liquefied by the liquefier 3 can be transferred into the storage facility 4 intermittently and/or continuously and/or in the event of the liquid level in the storage facility 4 falling below a specific threshold. Preferably, the liquid level in the storage facility 4 is automatically controlled via the supplying on the part of the liquefier 3 (flow rate from the liquefier 3 and/or valve for regulation of the flow rate of liquid supplied to the storage facility 4).

The installation additionally comprises a pipe 10 for withdrawal of liquid comprising an end connected to the liquid hydrogen storage facility 4 and an end intended to be connected to one or more tank(s) 8 to be filled, in particular mobile tank(s), such as tanks mounted on delivery trucks.

This withdrawal pipe 10 can be provided with a valve 19, for example a piloted valve, and/or a pump or other.

These trucks can in particular feed fixed tanks, in particular stations for supplying hydrogen to vehicles.

Thus, the storage facility 4 can be filled via a filling pipe 12 which emerges in the liquid part, in particular in the bottom of the storage facility 4. For example, this pipe 12 can pass through the vacuum insulation space in the storage facility 4 interwall (cf. FIG. 2).

The transfer/filling can be controlled via a valve 16 (for example a piloted valve) located on this pipe 12.

The installation example of FIG. 2 additionally comprises a transfer pipe 13 having an end connected to the outlet of the liquefier 3 and an end intended to be directly connected to the tank(s) 8 (without passing through the storage facility 4). The transfer pipe 13 can be equipped with a valve 20 (preferably a piloted valve) in order to transfer liquid hydrogen from the liquefier 3 to the tank 8.

The liquefier 3 is configured to produce a subcooled liquid, that is to say at a temperature below the bubble point of hydrogen at the pressure of the storage facility.

This liquid thus has available an "energy reserve" before beginning to evaporate. This can be obtained with a cycle liquefier of "Turbo-Brayton" type where the working fluid is typically a helium-based mixture. The liquefier 3 can, for example, be a liquefier, the working fluid of which comprises or consists of helium. For example, the liquefier 3 can comprise a "Turbo-Brayton" cryogenic system sold by the applicant, which can provide in particular a refrigeration and a liquefaction from 15 K to 200 K.

Of course, any other liquefaction solution can be envisaged. Thus, for example, other configurations are possible with hydrogen working fluid cycles comprising vacuum expansion valves, or with systems for postliquefaction subcooling of hydrogen of liquid turbine or additional helium cycle type.

With this type of liquefier 3, it is possible to supply subcooled liquid hydrogen at temperatures as low as 15 K and at pressures as high as 10 bar absolute. In this case, the tank 8 can be filled in several stages and according to several scenarios described below.

In particular, according to a first phase, the tank 8 can be partially filled directly by the liquefier 3.

In this first phase, the tank 8 can be filled via the transfer pipe 13 with hydrogen originating directly from the liquefier 3, which is capable of supplying hydrogen at the initial pressure prevailing in the tank 8 (inlet pressure of the tank 8), which can be greater than the pressure in the storage facility 4.

The subcooled liquid transferred into the tank 8 (preferably in the upper part) comes into contact with the warm gas headspace of the tank 8. This lowers the temperature and the pressure of the tank 8 by condensing a part of the gas headspace.

During this first phase, the tank 8 can pass into a stratified state (no overall thermodynamic equilibrium linked to a nonhomogeneity of the temperatures at equilibrium). The subcooled liquid will also come into contact with the relatively warmer internal (metal) walls of the tank 8, which will cool down.

In this first stage or first phase, the amount of liquid hydrogen transferred into the tank 8 can be one from:
- a predefined amount of liquid hydrogen,
- a predefined fraction of the liquid storage volume in the tank 8, for example a tenth,
- the amount of liquid hydrogen corresponding to a predefined duration of transfer of liquid hydrogen from the first source of liquid hydrogen to the tank 8 with a specific flow rate,
- the amount of liquid hydrogen necessary to lower the temperature and the pressure in the tank 8 by respective predetermined values, the amount of liquid hydrogen necessary to reach, in the tank 8, respective predetermined temperature and pressure values.

In a second possible phase, the tank 8 can be at least partially depressurized in the storage facility 4.

During this second possible phase, the tank 8 can be depressurized by withdrawal of gas which is returned (via a recovery pipe 11, for example) into the liquid phase of the storage facility 4.

This warm gas is then partially or completely condensed in the storage facility 4 by direct energy exchange with the subcooled liquid of storage facility 4.

In order to completely condense this recirculated gaseous hydrogen and to keep the temperature of the storage facility 4 constant after each filling, the temperature of the liquid hydrogen sent into the storage facility 4 by the liquefier 3 can optionally be adjusted downward.

In a third possible phase, the tank 8 can be depressurized at least partially toward the atmosphere or a recovery zone down to a pressure lower than the pressure of the storage facility 4. This can be achieved, for example, via a venting pipe 15 which can be provided with a valve (for example a controlled valve).

Preferably, this third phase of depressurization is interrupted so that the pressure in the tank 8 is at a pressure strictly greater than atmospheric pressure in order to avoid any problem of cryopumping of air toward the tank 8.

In a fourth phase, the tank 8 is filled (preferably up to its target filling level) from the storage facility 4 and preferably by pressure difference between the storage facility 4 and the tank 8. In this fourth phase, the tank 8 is preferably at a sufficiently low pressure for the filling by pressure difference with the storage facility 4 to be possible (pressure disparity between 300 and 1000 mbar). This transfer can be continued in this way until the liquid reaches the desired level in the tank 8.

The filling method uses at least the first phase and can use one or more of the other phases defined above.

Preferably, the initial conditions of the tank 8 (pressure and/or temperature) can be measured or determined. This is because the filling process can use all these phases or omit one or more of them, as illustrated in the examples described below.

Figure 3:
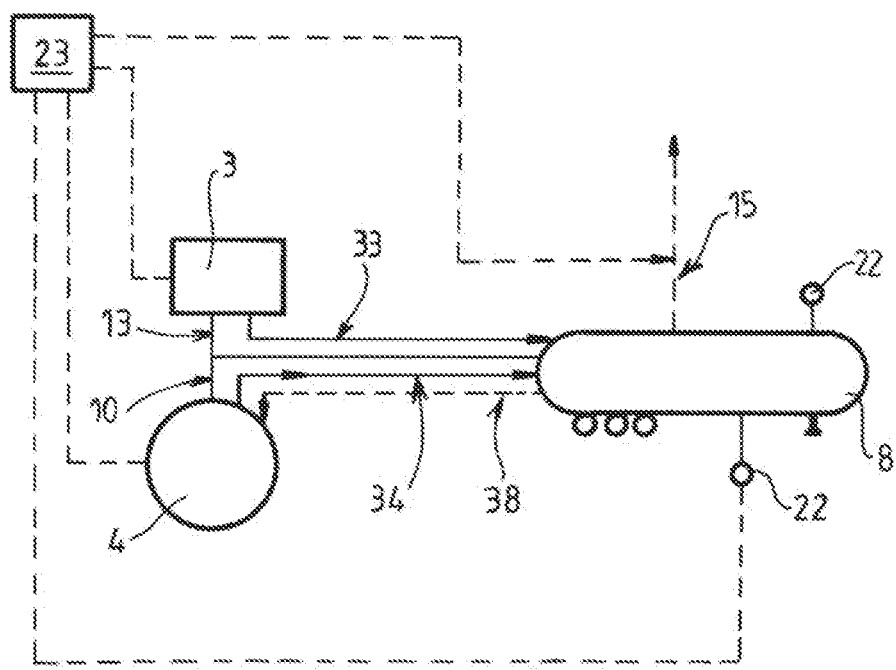

For example, as illustrated in FIG. 3, the device can comprise a set 22 of pressure and/or temperature sensor(s) in the tank 8.

Thus, when the initial conditions in the tank 8 to be filled are as follows: pressure is between 1 and 5 bar and preferably equal to 3 bar abs and temperature of the gas headspace of the tank is between 20 K and 120 K and preferably equal to 70 K, preferably the filling process uses the $1^{st}$ and $4^{th}$ phases and omits the $2^{nd}$ and $3^{rd}$ phases.

When the initial pressure is between 5 and 8 bar and preferably equal to 6 bar abs and when the temperature of the gas headspace of the tank is between 20 K and 120 K and preferably equal to 100 K, preferably the filling process uses the four phases (that is to say, including the intermediate phases of depressurization of the tank 8).

When the initial pressure between 8 and 12 bar and preferably equal to 10 bar abs and when the temperature of the gas headspace of the tank is between 20 K and 120 K and preferably equal to 70 K, preferably the filling process uses the four phases.

The inventors have demonstrated that this filling strategy makes it possible to reduce the boil-off losses originating from different sources.

This filling method advantageously uses the subcooling capability of the liquefier 3 (of "Turbo-Brayton" type, for example) and also its capability of supplying liquid hydrogen at relatively high pressures (for example up to 10 bar absolute). This makes it possible to avoid a system of recirculation of the boil-off gas and the overproportioning of the liquefier 3. This can be avoided at the cost of a slight additional energy expenditure due to the liquefaction, as explained below.

The first phase (first transfer stage) makes it possible to bring the tank 8 into thermodynamic equilibrium and to considerably lower its pressure and its temperature.

During the first stage (phase 1), the warm fluid present in the tank 8 can be kept in the tank 8 by closing the valve 21 on the pipe 11 for return to the storage facility 4, until the pressure in the tank 8 has fallen sufficiently (down to a specific pressure level) as a result of the condensation of the warm vapors by the subcooled liquid hydrogen originating from the liquefier 3.

After a time determined by the pressure in the tank 8, this direct partial filling from the liquefier 3 is stopped and, depending on the pressure in the tank 8, the continuation (and the end) of the filling of the tank 8 can be carried out by pressure difference with the storage facility 4 (phase 4).

If, on the contrary, the pressure of the tank 8 remains too high on conclusion of the first phase/stage, the tank 8 can first be depressurized into the bottom of the storage facility 4 (phase 2, which is a stage of reduction in the pressure within the tank 8) and/or depressurized toward the outside (phase 3, which is a stage of reduction in the pressure within the tank 8).

In the event of depressurization into the storage facility 4, the level in the storage facility 4 may increase slightly (less than 1% by volume, for example).

In order to condense all the mass of warm gas transferred into the storage facility 4, a sufficient amount of subcooled liquid hydrogen must be sent to the storage facility by the liquefier 3.

The adjustment of the level of subcooling of the liquid at the outlet of the liquefier 3 can thus be controlled in order to limit or nullify the losses of hydrogen by evaporation.

In the case where the initial conditions of the tank 8 are too "extreme" (pressure equal to or greater than 10 bar abs and temperature of the gas equal to or greater than 100 K, for example), it can be advantageous not to carry out phase 2 or only partially, in order to prevent the mass of warm depressurized gas from disturbing the conditions of the storage facility 4, requiring, in order to compensate, an excessively large amount of liquid hydrogen from the liquefier 3.

This is because this additional mass of liquid hydrogen supplied by the liquefier 3 can cause a significant additional expenditure. In order to prevent this, an alternative or simultaneous solution to phase 2 can be to depressurize the warm gas from the tank 8 to the atmosphere (phase 3).

On the other hand, in more favorable cases (for example an initial pressure of less than or equal to 3 bar abs and an initial temperature of less than or equal to 70 K), it is possible to fill the tank 8 without the stage of reduction in pressure (phases 2 and/or 3).

Thus, in these situations, the first stage (phase 1) may be sufficient to lower the pressure in the tank 8 below the pressure of the storage facility 4, making possible filling by pressure difference.

It should be noted that, in the case of insufficient pressure difference, it is also possible to use a pump to transfer the liquid from the storage facility 4 to the tank 8.

The inventors have demonstrated that this method makes it possible to reduce losses by evaporation up to a factor of eight to ten compared with a conventional filling procedure.

This solution makes it possible to dispense with a system for recirculation of the evaporated gases as described in the preamble.

The present solution makes it possible to reduce the capital cost of the installation in this way at the cost of slightly increased liquefaction energy consumption.

In addition, depending on the price of energy and on the value of hydrogen, the system described makes possible overall an overall saving with respect to the cost of production of liquid hydrogen delivered in the tanks 8.

The solution also makes it possible to increase, if appropriate, the subcooling of the liquid when the amounts of hydrogen available are lower. This advantageously makes it possible to adjust the level of subcooling of the liquid contained in the storage facility 4. Thus, this liquid in the storage facility 4 has an "energy reserve" or "frigories reserve" before starting to evaporate.

In the case where the installation makes possible the filling of several tanks simultaneously (several pipes 11, 13 or several ends to these pipes), preferably the installation 1 can be configured to sequence the different stages (phases) in order to make it possible to sequentially use the first transfer stage (phase 1) between the different tanks 8. Likewise, the installation 1 can be configured to sequence the other stages/phases for the different tanks 8 to be filled.

The term "configured to" is understood to mean that the installation can be controlled manually and/or automatically. For example, as shown diagrammatically in FIG. 3, the installation 1 can comprise an electronic control unit 23 comprising, for example, a computer or microprocessor configured (programmed/controlled) to control and pilot all or part of the components of the installation (liquefier, valve(s), and the like).

The warm fluid recovered by the recovery pipe 11 can thus be returned to the storage facility 4 in order to be cooled/condensed there. This configuration advantageously makes it possible to fill tanks 8 with subcooled hydrogen at a pressure greater than the maximum operating pressure of the storage 4, without using a pump.

The valve 21 of the return pipe 11 thus makes it possible to retain the pressure and the mass of hydrogen in the storage facility 4 by direct reliquefaction.

Preferably, the liquefier 3 is configured to produce and to feed the storage facility 4 with hydrogen at a temperature below the bubble point of hydrogen at the storage pressure.

The storage pressure is, for example, between 1.05 bar and 5 bar, in particular 2.5 bar.

For example, the liquid hydrogen produced by the liquefier 3 and transferred into the storage facility 4 has a temperature lower by 0.1 to 12 K with respect to the bubble point of hydrogen at the storage pressure, in particular at a temperature of between 16 K and 23 K for a storage pressure of between 1.05 and 11 bar, in particular a temperature of 20.4 to 21 K for a storage pressure of 2.5 bar.

For example, the liquid hydrogen produced by the liquefier and transferred into the storage facility 4 has a temperature between the saturation temperature at the pressure of the liquid and the saturation temperature at the pressure of 1.1 bar abs, in particular a temperature of 20.4 to 23.7 K for a storage pressure of 2.5 bar.

The liquid hydrogen produced by the liquefier and transferred into the storage facility 4 can have a temperature between the saturation temperature at the pressure of the liquid and the temperature just greater than the solidification temperature of hydrogen, in particular a temperature of 15 K to 23.7 K for a storage pressure of 2.5 bar.

Likewise, the liquid hydrogen produced by the liquefier is transferred directly into the tank 8 and optionally also into the storage facility 4 and can have a temperature between the saturation temperature at the pressure of the liquid and the temperature just above the solidification temperature of hydrogen, in particular a temperature of 15 K to 23.7 K for a storage pressure of 2.5 bar.

That is to say that the liquefier 3 produces a liquid which is subcooled with respect to the configurations of the prior art, that is to say at a temperature below the bubble point of hydrogen at the pressure of the storage facility 4.

Bubble point designates the temperature (at a given pressure) from which the first bubbles from boiling (vaporization) appear.

Preferably, the liquefier 3 directly supplies the liquid hydrogen at subcooled thermodynamic conditions. For example, at the outlet of the liquefier 3, the hydrogen has subcooling conditions which optionally take into account the heating in the circuit leading as far as the storage facility 4.

Preferably, the hydrogen liquid and gas phases are not at thermodynamic equilibrium in the storage facility 4. That is to say that the hydrogen gas and liquid phases of the storage facility 4 have different respective temperatures. In particular, the hydrogen can be maintained at a stable pressure (storage pressure) but the temperature of the hydrogen, in particular gaseous hydrogen, can be stratified between the cold liquid phase in the lower part and the warmer gas part in the upper part.

In this configuration (different temperatures between the gas part and the liquid part), the great majority of the gas part can be at a temperature of 40 K.

In point of fact, the critical point of hydrogen is 12.8 bar at 33 K. It is thus not possible to condense the gas by increasing the pressure of the gas isothermally at 40 K.

It can then be easily concluded that, in a first approach, pressurization of the storage facility 4 by adding cold liquid via the bottom of the storage facility 4 is possible without condensation of the gas headspace.

It is thus possible to obtain a metastable (or unstable) thermodynamic system comprising a relatively "warm" gas headspace (at a temperature greater than or equal to 40 K, for example) and a liquid part having a temperature corresponding to its bubble point, or below. This is a particular case of a subcooled liquid associated with a temperature-stratified gas headspace.

The storage pressure can be comprised and maintained between 1.05 bar and 5 bar, in particular 2.5 bar.

The storage facility 4 and the tank 8 can be jacketed and vacuum insulated.

The installation 1 can comprise a pipe 14 having an end connected to the outlet of the liquefier and an end emerging in the gas phase of the storage facility 4 (in the upper part).

The installation can thus be configured to maintain the level of liquid in the storage facility 4 above a specific threshold by automatically supplying the storage facility with hydrogen produced by the liquefier 3.

The pressure in the storage facility 4 can be controlled, for example, by controlling the pressure of the gas headspace. For example, the pressure can be increased (conventional device for injecting warmer hydrogen into the gas headspace, not represented in the figure for the sake of simplification). That is to say that a device for increasing pressure can withdraw liquid from the storage facility, reheat it and reinject it into the upper part of the storage facility 4.

In order to decrease the pressure in the storage facility 4, one solution can consist in injecting liquid hydrogen originating from the liquefier 3 by spraying into the gas part. This can be carried out via a suitable pipe 14 provided with a valve 17, for example. In order to reduce the pressure in the storage facility 4, it is also possible to discharge to the air a part of the gaseous hydrogen contained in the gas headspace (for example, pipe 18 provided with a valve, not represented).

The invention can be applied to gases other than hydrogen, if appropriate.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method of filling a liquid hydrogen liquid hydrogen tank, the method comprising the steps of:
   a first transferring step of a first amount of liquid hydrogen into the liquid hydrogen liquid hydrogen tank from a first source of liquid hydrogen comprising a hydrogen liquefier, the first amount of liquid hydrogen being provided in order to lower a temperature and a pressure in the liquid hydrogen liquid hydrogen tank; and
   a second transferring step of a second amount of liquid hydrogen into the liquid hydrogen liquid hydrogen tank from a second source of liquid hydrogen comprising a liquid hydrogen storage facility, in which the first amount of liquid hydrogen is transferred directly from the hydrogen liquefier into the liquid hydrogen liquid hydrogen tank and the second amount of liquid hydrogen is transferred into the liquid hydrogen liquid hydrogen tank by pressure difference between the liquid hydrogen storage facility and the liquid hydrogen liquid hydrogen tank.

2. The method as claimed in claim 1, wherein the first amount of liquid hydrogen supplied by the first source of liquid hydrogen has a temperature below the bubble point of hydrogen at the storage pressure in the liquid hydrogen tank.

3. The method as claimed in claim 1, wherein the first amount of liquid hydrogen transferred into the liquid hydrogen tank is one from: a predefined amount of liquid hydrogen, a predefined fraction of the volume of liquid storage in the liquid hydrogen tank, the amount of liquid hydrogen corresponding to a predefined duration of transfer of liquid hydrogen from the first source of liquid hydrogen to the liquid hydrogen tank with a specific flow rate, the amount of liquid hydrogen necessary to lower the temperature and the pressure in the liquid hydrogen tank by respective predetermined values, the amount of liquid hydrogen necessary to achieve, in the liquid hydrogen tank, respective predetermined temperature and pressure values.

4. The method as claimed in claim 1, further comprising, between the first transferring step and the second transferring step, a pressure reducing step within the liquid hydrogen tank comprising at least one step selected from the group consisting of:
   withdrawing a pressurized gas from the liquid hydrogen tank to the storage facility, in particular by pressure balancing, and
   withdrawing a pressurized gas from the liquid hydrogen tank.

5. The method as claimed in claim 4, wherein the pressure reducing step within the liquid hydrogen tank comprises a withdrawal of pressurized gas from the liquid hydrogen tank to the liquid phase of the storage facility, in order to condense, at least in part, said pressurized gas in the storage facility.

6. The method as claimed in claim 4, further comprising the step of transferring liquid hydrogen from the first source of liquid hydrogen to the liquid hydrogen storage facility at a temperature that is adjusted in order to maintain the temperature in the storage facility within a specific interval.

7. The method as claimed in claim 4, wherein the pressure reducing step within the liquid hydrogen tank comprises withdrawing the pressurized gas from the liquid hydrogen tank, and in that, on conclusion of this pressure reducing step, the pressure within the liquid hydrogen tank remains greater than atmospheric pressure.

8. The method as claimed in claim 4, wherein, depending on the initial pressure and optionally temperature conditions within the liquid hydrogen tank before the first transfer stage, the method comprises or does not comprise a stage of reduction in the pressure within the liquid hydrogen tank.

9. The method as claimed in claim 1, further comprising, prior to the first transferring step, a step of measuring or estimating an initial pressure within the liquid hydrogen tank.

10. The method as claimed in claim 9, further comprising, prior to the first transferring step, a step of measuring or estimating temperature conditions within the liquid hydrogen tank.

11. The method as claimed in claim 10, wherein when the initial pressure within the liquid hydrogen tank is between 4 and 8 bar abs, and when the initial temperature in the liquid hydrogen tank is between 80 and 120 K, the method comprises a step of reducing the pressure within the liquid hydrogen tank between the first and the second transferring steps.

12. The method as claimed in claim 10, wherein when the initial pressure within the liquid hydrogen tank is between 8 and 12 bar abs, and when the initial temperature in the liquid hydrogen tank is between 20 and 120 K, the method comprises a step of reducing the pressure within the liquid hydrogen tank between the first and the second transferring steps.

13. The method as claimed in claim 9, wherein when the initial pressure within the liquid hydrogen tank is between 1.05 and 12 bar absolute, the second transferring step is carried out directly after the first transferring step, without withdrawal of fluid from the liquid hydrogen tank between the first and second transferring steps such that a reduction in the pressure in the liquid hydrogen tank is achieved.

14. An installation for the storage and distribution of liquefied hydrogen:
comprising a liquid hydrogen storage facility at a specific storage pressure;
a source of gaseous hydrogen;
a liquefier comprising an inlet fluidly connected to the source and an outlet fluidly connected to the liquid hydrogen storage facility, wherein the liquefier is configured to produce liquid hydrogen and to feed the storage facility with liquid hydrogen at a temperature below the bubble point of hydrogen at the storage pressure;
a liquid withdrawal pipe comprising an end connected to the liquid hydrogen storage facility and at least one other end configured to be connected to a mobile liquid hydrogen tank,
a boil-off gas recovery pipe comprising a first end configured to be connected to the mobile liquid hydrogen tank and a second end configured to be connected to the storage facility;
a transfer pipe having a first end connected to the outlet of the liquefier and a second end configured to be connected directly to the mobile liquid hydrogen tank,
the installation being configured to fill the mobile liquid hydrogen tank by transferring a first amount of liquid hydrogen from the liquefier into the liquid hydrogen tank via the transfer pipe and then a second amount of liquid hydrogen from the storage facility to the mobile liquid hydrogen tank via the liquid withdrawal pipe.

15. The installation as claimed in claim 14, wherein the installation is further configured to decrease the pressure within the mobile liquid hydrogen tank, between the transfers of the first and second amounts of liquid hydrogen, by withdrawing of pressurized gas from the liquid hydrogen tank to the storage facility via the recovery pipe, and/or withdrawing a pressurized gas from the mobile liquid hydrogen tank via a venting pipe.

16. The installation as claimed in claim 14, further comprising a set of sensor(s) configured to measure or estimate operational conditions within the liquid hydrogen tank before filling and in that the installation is configured to produce or not produce, between the first and second transferring steps, a decrease in the pressure within the liquid hydrogen tank as a function of said operational conditions within the liquid hydrogen tank, wherein the operational conditions comprise pressure.

17. The installation as claimed in claim 16, wherein the operational conditions further comprise temperature.

\* \* \* \* \*